United States Patent Office 2,847,450
Patented Aug. 12, 1958

2,847,450

PRODUCTION OF ACRYLONITRILE

Thomas R. Steadman, Waban, and Leslie H. Sutherland, Wellesley, Mass., assignors to Escambia Chemical Corporation, Pace, Fla., a corporation of Delaware No Drawing. Application July 25, 1957
Serial No. 674,022

6 Claims. (Cl. 260—465.3)

This invention relates to an improved catalyst and process for the production of acrylonitrile.

A principal object of the present invention is to produce high yields of acrylonitrile readily and cheaply by reacting hydrogen cyanide with acetylene in the presence of an improved catalyst.

Other objects of the invention will in part be obvious and will in part appear hereinafter.

The invention accordingly comprises the process involving the several steps and the relation and the order of one or more of such steps with respect to each of the others, which are exemplified in the following detailed disclosure and the scope of the application of which will be indicated in the claims.

For a fuller understanding of the nature and objects of the invention, reference should be had to the following detailed description.

It is well known that acrylonitrile can be prepared by reacting hydrogen cyanide with acetylene in the vapor phase in the presence of a suitable catalyst. Many catalysts have been reported as suitable for this reaction and include such materials as activated carbon, silica gel, and solid, porous materials, having either a high surface activity or little or no surface activity, impregnated with alkali metal cyanides or hydroxides or mixtures of alkali metal cyanides, etc.

It has been recognized that when the porous supports for the catalyst comprise unactivated charcoals some pretreatment is required in order to obtain good yields of acrylonitrile. For example, U. S. Patents 2,419,186 and 2,734,072 advocate heating the unactivated charcoal to temperatures on the order of 1000° C. in order to devolatize the charcoal. U. S. Patent 2,789,126 recommends a vacuum pretreatment to remove volatiles. U. S. Patent 2,762,834 teaches that the unactivated charcoal be deoxygenated prior to use. In the latter patent, the catalyst was prepared by heating the unactivated charcoal above 500° C. in the presence of a reducing atmosphere such as hydrogen. The resultant deoxygenated charcoal was then impregnated with either an alkali metal hydroxide, carbonate or cyanide. One aspect of the present invention is directed to a catalyst preparation wherein the charcoal pretreatment and catalyst impregnation is accomplished in a single step.

The present invention is directed to the catalytic vapor phase production of acrylonitrile from hydrogen cyanide and acetylene, in particular, to an improved catalyst for the reaction. The process of the present invention consists in reacting a mixture of hydrogen cyanide and acetylene in the vapor phase in the presence of an inert or porous support such as unactivated charcoal treated with about 1.5% to 10% by weight of an alkali metal. In a preferred embodiment the charcoal is treated with free sodium metal.

In a preferred aspect of the invention, the inert or porous support is a softwood charcoal, due to its lower cost. This charcoal is conditioned for use as the catalyst support by treating it directly with a free alkali metal.

The resulting charcoal is then ready for use in the reaction without any further treatment.

In one preferred embodiment of the invention, high yields of acrylonitrile are obtained by reacting hydrogen cyanide and acetylene in the presence of the preferred catalyst at temperatures on the order of 450° C. to 700° C.

A more detailed disclosure of one method of producing acrylonitrile by use of the improved porous charcoal catalyst is illustrated in the following example which is set forth only for the purpose of illustration and is not to be construed as limiting the invention in any way.

*Example I*

9 grams of sodium metal were dissolved in one liter of liquid ammonia. Over a period of ten minutes 225 grams of 20 x 40 softwood charcoal was added to the ammonia solution. Vigorous boiling occurred which was caused not only by the cooling of the charcoal but also becasue of the reaction involving the sodium. The blue sodium color disappeared during the addition of charcoal. When the charcoal was completely added, an additional 4 grams of sodium metal was added to the charcoal containing ammonia. The ammonia was then evaporated off.

A mixture of dilute acetylene and hydrogen cyanide was passed through a 1½ inch I. D. brass reactor containing 150 grams of catalyst prepared as above. The reactor was maintained at a temperature of about 590° C. The mole ratio of acetylene to hydrogen cyanide was 0.8 with the amount of acetylene in the dilute acetylene stream amounting to 7.4 percent. The remainder of the acetylene stream consisted of hydrogen, nitrogen and methane. The pressure in the reactor was substantially atmospheric. This 12 hour run gave acetylene conversions on the order of 76 percent and yields based on hydrogen cyanide of about 85.6 percent.

Either softwood or hardwood charcoals have been found to be satisfactory for use as catalyst supports. However, from an economic standpoint softwood charcoals are preferable.

The unactivated charcoal is prepared for use as a catalyst support by treating it directly with a free alkali metal. This treatment accomplishes a two-fold purpose. First, it reacts with the charcoal or the materials adsorbed in or combined with the charcoal to make it suitable for use as a catalyst support. Second, the reaction of the alkali metal with the charcoal forms the catalyst impregnation required.

In addition to sodium metal, the other alkali metals, lithium and potassium can also be employed. The charcoal support is preferably impregnated with between about 1.5 percent and 10 percent by weight of the alkali metal. As illustrated in the example, the alkali metal, sodium in this case, was reacted with unactivated charcoal in liquid ammonia. Although other inert mediums such as methylamine can be employed, liquid ammonia is preferred since it is cheap and can be removed easily by evaporation from the alkali metal treated charcoal.

The charcoal catalyst support can be of any desired mesh size. When stationary catalyst beds are employed then a wide range of charcoal particle sizes can be employed. However, when fluidized catalyst beds are utilized then very small charcoal particle sizes must be avoided since the gas stream will carry it out of the reaction zone. Likewise, if the particle sizes are too large, operation of the fluidized bed will be very difficult.

In the above examples, specific operating conditions have been given. As mentioned previously, these are subject to considerable variation without departing from the scope of the invention. For example, the temperature range in the reactor may vary from about 450° C, to about 700° C. The pressure range in the reactor may vary from about atmospheric pressure to about 100 p. s. i. Equally, the molar ratio of acetylene to hydrogen cyanide may be varied quite widely between about 0.5:1 to about 1.6:1 and higher. Equally, the space velocity may range from about 100 hr.$^{-1}$ to about 1000 hr.$^{-1}$.

In the example cited above, a dilute stream of acetylene was employed. The amount of acetylene in this stream was about 7.4 percent. The process is suitable when using dilute acetylene streams produced by such well known methods as the "Wulff" and "Sachsse." Although this invention has been described in connection with the use of dilute acetylene streams, it is also applicable to concentrated acetylene streams.

The catalyst preparation and process described herein is an improvement over the previously mentioned prior art since (1) it, in one step, easily and properly conditions the charcoal for use as a catalyst support and at the same time impregnates therein suitable catalytic material for the reaction, (2) eliminates the use of high temperatures and (3) eliminates the use of expensive vacuum equipment such as needed for the catalyst conditioning shown in U. S. 2,789,126.

Since certain changes may be made in the above process without departing from the scope of the invention herein involved, it is intended that all matter contained in the above description shall be interpreted as illustrative and not in a limiting sense.

What is claimed is:

1. The process of producing acrylonitrile which comprises reacting hydrogen cyanide and acetylene at a temperature within the range of 450° C. to 700° C. in the presence of a catalyst prepared by treating unactivated charcoal with from about 1.5% to about 10% by weight of an alkali metal.

2. The process according to claim 1 wherein said charcoal is treated with from about 1.5% to about 10% by weight of sodium.

3. The process of producing acrylonitrile which comprises reacting hydrogen cyanide and a dilute acetylene stream at a temperature within the range of 450° C. to 700° C. in the presence of a catalyst prepared by treating unactivated charcoal with from about 1.5% to about 10% by weight of an alkali metal.

4. The process according to claim 3 wherein said charcoal is treated with from about 1.5% to about 10% by weight of sodium.

5. The process according to claim 3 wherein said acetylene stream contains less than about 15 percent acetylene.

6. The process of producing acrylonitrile which comprises reacting hydrogen cyanide and acetylene at a temperature within the range of 450° C. to 700° C. in the presence of a catalyst prepared by treating unactivated charcoal with from about 1.5% to about 10% by weight of an alkali metal while in the presence of liquid ammonia, and then recovering the treated charcoal by evaporating the ammonia.

References Cited in the file of this patent

UNITED STATES PATENTS

| | | |
|---|---|---|
| 2,502,678 | Spaulding et al. | Apr. 4, 1950 |
| 2,780,640 | Gabbett et al. | Feb. 5, 1957 |
| 2,805,244 | Gabbett et al. | Sept. 3, 1957 |